United States Patent [19]
Bezos et al.

[11] Patent Number: 4,940,292
[45] Date of Patent: Jul. 10, 1990

[54] RAPID RELEASE VALVE MECHANISM

[75] Inventors: Angel P. Bezos; Gary W. Egerton, both of Montgomery County, Md.

[73] Assignee: Pulse Electronics, Inc., Rockville, Md.

[21] Appl. No.: 340,263

[22] Filed: Apr. 19, 1989

[51] Int. Cl.$^5$ .............................................. B60T 17/04
[52] U.S. Cl. ........................................ 303/81; 251/66; 251/248; 303/68; 303/86
[58] Field of Search ............. 251/66, 74, 248, 129.02, 251/129.11, 251, 252, 253, 262, 263, 304, 305, 313, 70, 68; 303/86, 81, 68, 69, 1

[56] References Cited

U.S. PATENT DOCUMENTS

| | | | |
|---|---|---|---|
| 2,048,353 | 7/1936 | Rose | 303/86 |
| 2,937,907 | 5/1960 | Harris et al. | 303/81 X |
| 3,606,980 | 9/1971 | Simpson et al. | 251/66 |
| 3,811,456 | 5/1974 | Nelson | 251/66 X |
| 4,044,996 | 8/1977 | Kodaira | 251/251 X |
| 4,326,754 | 4/1982 | Harding | 303/81 |
| 4,487,060 | 12/1984 | Pomeroy | 246/169 R |
| 4,596,265 | 6/1986 | Goodell | 303/69 X |
| 4,641,892 | 2/1987 | Schmid | 303/86 X |

Primary Examiner—Douglas C. Butler
Attorney, Agent, or Firm—Whitham & Marhoefer

[57] ABSTRACT

A motor driven ball valve may be driven in two modes of operation; those modes are a normal or testing mode and an emergency mode. The ball valve, when in its full open position, has an air passage that allows for the rapid exhaust of air in the air pipe of the air brake system to atmosphere, thereby inducing the emergency application of the brakes. The rotating ball valve assembly is capable of infinite variation between its full closed and its full open positions. Thus, the motor drive, which is remotely controlled, can effectively modulate the reduction in air pressure in the air pipe for a variety of purposes, including normal operation of the brakes and testing the air brake system. The motor drive mechanism may be in a cam, gear, or follower configuration. When an emergency application of the brakes is required, the motor drive mechanism is disengaged to allow a spring or other torsion device to rapidly rotate the ball to full open position, while drawing minimal electrical power. The spring or other torsion mechanism is prestressed by the operation of the motor driven mechanism as it rotates the ball toward its closed position.

12 Claims, 5 Drawing Sheets

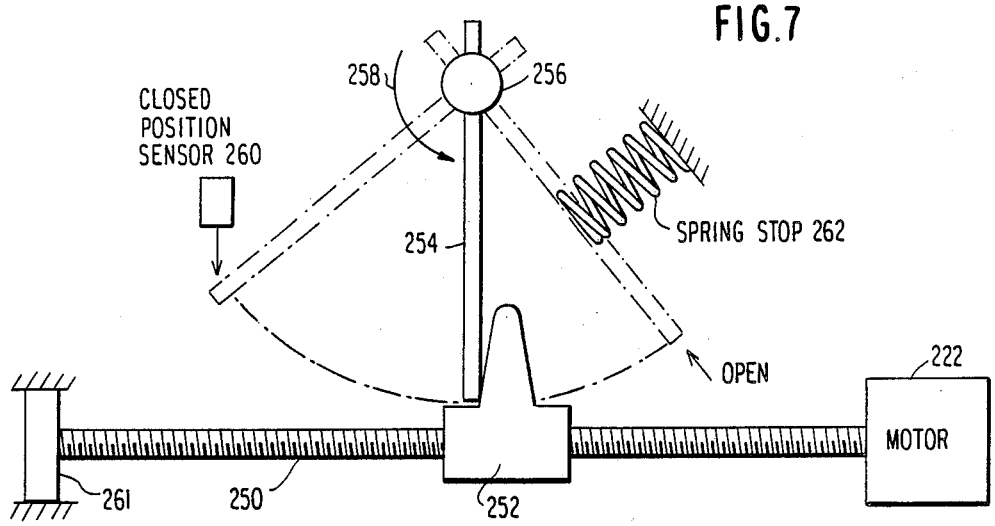
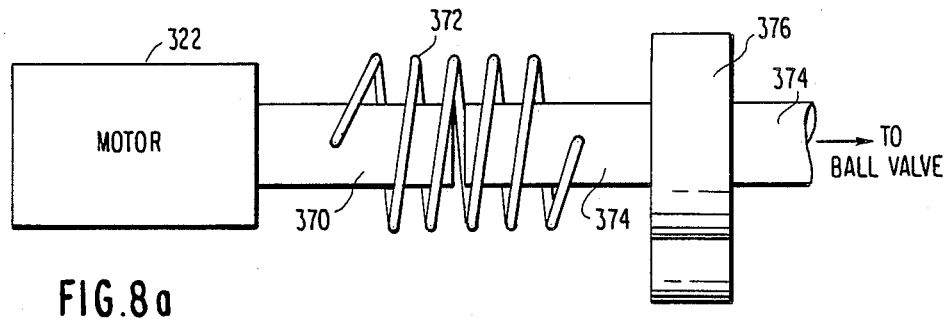
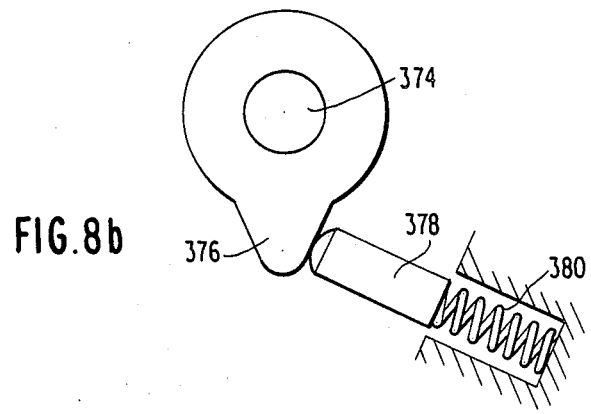

RAPID RELEASE VALVE MECHANISM

BACKGROUND OF THE INVENTION

1. Field of the Invention

This invention generally relates to valve mechanisms for controlling the air pressure in an air brake system used on railroad trains and, more particularly, to a motor driven valve mechanism which is capable of rapidly venting air in an air pipe to the atmosphere in an emergency situation.

2. Description of the Prior Art

Air brake systems used on railroad rolling stock comprise a pressurized system which normally holds the brake shoes from contacting the brake drums on the individual trucks of the various cars. Pressure is supplied by an air pipe that, when coupled from car to car, extends from the locomotive to last car of the train. Once the air pipe is pressurized in a yard, the pressure is maintained by a locomotive driven compressor. The brakes at the individual trucks are applied in a controlled manner by reducing the pressure in the air pipe slowly. The brakes at the individual trucks are rapidly applied in an emergency operation by venting the air pipe to atmosphere.

U.S. Pat. No. 4,641,892 to Schmid shows remote control of air brakes during an emergency situation. Telemetry equipment directs a solenoid operated pilot valve actuator to open when the train needs to be stopped in an emergency. Operation of the solenoid creates a difference in pressure between the primary or valve seating side of a quick exhaust valve and its secondary side. The difference in pressure unseats the quick exhaust valve and allows the air pipe to be vented to atmosphere.

A solenoid valve, as shown in the Schmid patent, is particularly disadvantageous for use on railroad trains because solenoid type valves are not very tolerant of debris. Most trains, after a long period of use, tend to have rusted brake pipes. The presence of rust and corrosion may hinder the emergency operation of the brakes in Schmid.

U.S. Pat. No. 4,487,070 to Pomeroy shows an apparatus for remotely monitoring the air pressure of the air pipe at the end of a train. The information, including emergency warning signals, is telemetered to the engineer in the locomotive.

A two-way link between the end of the train and the locomotive has been proposed for allowing the engineer to control certain functions at the end of the train. These functions may include emergency operation of the brakes, or testing operations to determine if the air pressure sensors or brakes are operable. While the Schmid valve actuator might be controlled remotely from the locomotive cab using such a two-way link, the only function of this valve actuator is to vent the air pipe to atmosphere in an emergency application of the brakes.

SUMMARY OF THE INVENTION

It is therefore an object of this invention to provide a more rugged and reliable rapid release valve mechanism which operates the brakes of the individual cars in a train by venting the air pipe to atmosphere.

It is another object of this invention to provide a rapid release mechanism used on railroad cars which may both vent the air pipe immediately during an emergency operation by opening fully in a very short period of time or vent the air pipe slowly in a controlled or test operation by opening slowly over a longer period of time.

It is another object of the invention to provide a rapid release mechanism which requires little electrical power when triggering an emergency release.

It is another object of the invention to provide a remote controlled valve actuator which is useful in an air brake system to perform required air brake leakage tests.

According to the present invention, there is provided a motor driven ball valve which may be operated in two modes; those modes are an emergency mode and a normal/testing mode. In an emergency operation, the ball valve is caused to turn immediately to its full open position. An air passage through the ball valve permits rapid exhaust of air from the air pipe, thereby inducing the emergency application of the brakes. During the normal/testing mode, the rotating ball valve is capable of infinite variation between its full open and full closed positions. The motor drive can effectively modulate the reduction in air pressure in the air pipe for a variety of purposes, including normal operation of the brakes and testing the air brake system. Two way communications between the locomotive cab and the rapid release valve allows an engineer to remotely cause application of the brakes in an emergency situation or remotely conduct tests on the brake system by directing the valve to open a predetermined amount, followed by sensing the air pipe pressure. Information obtained regarding the air pipe pressure can be telemetered to the locomotive cab.

The main function of the rapid release valve mechanism is to cause what is called an emergency brake application in the train to which it is connected. An emergency brake application on a train happens when at least one emergency brake valve in one of the cars in the train opens and vents the train pipe to atmosphere. The emergency brake valves are triggered when they sense a large enough rate of air pressure drop in the brake pipe. Their trigger point is normally around twenty pounds per square inch (psi) per second. Whenever any one of the many emergency brake valves on a train (there is one per car) gets triggered, the air system in the other cars is such that the rate of pressure drop induced by the car with the open emergency brake valve will trigger the emergency brake valves of the car or cars connected to it. Thus, in a typical emergency brake application, one car will trigger other cars and the "emergency" (i.e., the venting of the air pipe air to atmosphere) propogates very rapidly along a long train. Thus, to accomplish its main function, the rapid release valve must be able to trigger the emergency brake valve of the car to which it is connected. For safety factor reasons, both the rapid release valve and the emergency brake valves on the cars are able to induce air pressure rate drops that are large enough to "jump" several cars. That is, if the the rapid release valve or a particular car's emergency brake valve happens to be connected to another car that has a defective or "stuck" emergency brake valve, the emergency will still propogate along the train since the air pressure drop rate will be large enough to jump and trigger the next car.

Control of the ball valve may be implemented in many different ways. Preferably, a cam is used to control the movement of the ball valve. The cam has concave and a convex surfaces. A follower pin, positioned on a cam follower connected to the shaft which drives the ball valve, acts against the surfaces of the cam. In an emergency situation, the cam is caused to rotate to a point where the follower pin is allowed to move rapidly along the concave surface. Rapid movement is due to stored energy in a spring which is connected to the underside of the cam follower and positioned around the shaft which drives the ball valve. As the cam follower rotates, the shaft is turned, thus causing the valve to open rapidly. In a normal/testing mode, the follower pin travels on the convex surface of the cam. The convex surface is large enough to allow the ball valve to be driven to its full open and full closed positions. As the ball valve is rotated towards full closed, energy is stored in the spring.

One advantage of the above described mechanism is that the design is more rugged and reliable than solenoid actuated valves, which is especially important in railroad environments. The ball valve is more resistant to leaks induced by dirt, rust, debris and corrosion than other valves due to the high seal loading and wiping action of the ball. No rubber parts are used; therefore, less maintenance is required since rubber parts must be replaced after aging. The ball valve's flow path is straight and has a uniform cross-section that provides little opportunity for foriegn matter to lodge in the valve, unlike other valve types. The ball valve has no small pilot orifices to clog, unlike pilot valves. The ball valve is more resistant to shock than a pilot valve actuated valve mechanism and, therefore, accidental operation of the valve is less likely to be induced.

Another advantage of the above described mechanism is its ability to open the rotating ball valve rapidly (typically in under 100 milliseconds) and achieving this rapid release while at the same time consuming a very small amount of power from the battery. This is very important since: (a) it is necessary to open the valve rapidly in order to induce an emergency brake application on a train and (b) it is very desirable that opening the valve be accomplished using the minimum amount of power from the battery to insure that even batteries that are close to the fully discharged state can produce enough power to operate the valve mechanism without any significant degrading of performance.

Electrical power demand is reduced by utilizing the stored energy in a spring to rotate the ball valve. Only a small amount of power is required to move the cam to a point where the energy stored in the spring is released. Ball valves which have a direct mechanical linkage to the electrical motor require a large burst of electrical power to open the ball valve rapidly since no external force such as a spring aids in rotating the ball. Moreover, the rapid release ball valve of this invention, which utilizes the spring to rapidly open the ball valve, provides superior emergency brake operation since a faster opening time for opening the ball valve is achieved. A faster opening time corresponds to producing a higher air pressure drop rate in the brake pipe. As discussed above, the emergency brake valves at each car in the train respond to the rate of air pressure drop. A ball valve which is mechanically linked to an electric motor may not open fast enough to trigger the "emergency" operation where the emergency brake valves at adjacent cars in a train respond to the rate of air pressure drop (i.e., the rate of air pressure drop may be too slow).

Another advantage of the above described mechanism is that a variety of testing procedures can be performed from a remote location. For example, the required air brake leakage test which must be performed in the yard before a train is cleared for operation on the railroad can be performed by an engineer sitting in the locomotive using the two way telemetry equipment. In addition, the valve mechanism could be remotely commanded to "leak", that is, to open a specified amount to reduce air pipe pressure by, say, 2 psi to test for a closed angle cock. The valve mechanism could be commanded to do a minimum reduction or any other type of brake reduction test. The valve could be commanded to "test itself" by sensing valve rotation and position. The sensed position information could be telemetered to the locomotive cab along with other information such as air brake pressure to allow for determining if the valve is operating correctly.

BRIEF DESCRIPTION OF THE DRAWINGS

The foregoing and other objects, aspects and advantages of the invention will be better understood from the following detailed description of a preferred embodiment of the invention with reference to the drawings, in which:

FIG. 7 is a diagram of a screw and follower combination, where a lever, biased by a torsion spring, is manipulated by the follower to open and close a ball valve; and FIGS. 8a and 8b are side and end views, respectively, of a motor driven torsion spring used to open and close a ball valve.

DETAILED DESCRIPTION OF THE PREFERRED EMBODIMENTS OF THE INVENTION

Figure 1:
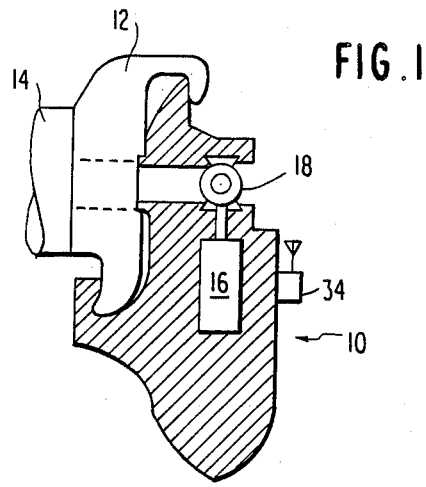
FIG. 1 is a cross-sectional side view of a ball valve assembly connected to a glad hand connector on the last car in a train.
Figure 2:
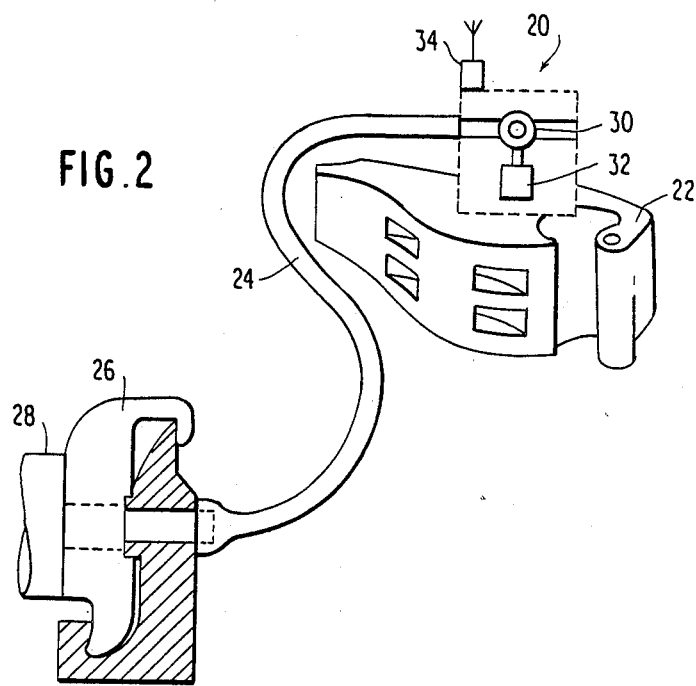
FIG. 2 is a sketch showing side views of a glad hand connector and a railroad coupler where a hose assembly connects the air pipe terminating at the glad hand connector with a ball valve housing positioned on the coupler of the last car in the train.

Referring now to the drawings and more particularly to FIGS. 1 and 2, which show alternative locations for placement of the ball valve assembly 10 or 20, respectively. The ball valve assembly 10 may be connected directly to the glad hand connector 12 which is located at the last car in the train at the termination of the air pipe 14 which extends the full length of the train. A battery powered motor and valve control mechanism 16 rotate a ball valve 18 to vent air in the pipe 14 to atmosphere. The ball valve assembly 20 may be affixed to the coupler 22 of the last car in the train and a hose 24 connects the ball valve assembly 20 to the glad hand connector 26. Air from pipe 28 passes through hose 24 and is vented to atmosphere by operation of the ball valve 30 which acts under the control of a battery powered motor and valve control mechanism 32. The arrangement shown in FIG. 2 has an advantage over the arrangement shown in FIG. 1 in that the ball valve assembly 20 is not as close to the ground as ball valve assembly 10 and, therefore, is less likely to be damaged by rocks, ice, etc., which are thrown by moving railroad cars.

Two way telemetry transceivers 34 permit communication with a transceiver located in the locomotive cab. The engineer may remotely transmit operations to be performed by the battery powered motor and valve control mechanisms 16 or 32. In addition, data sensed at the ball valve assemblies 10 or 20 such as air pressure or ball valve 18 or 30 position can be transmitted to the engineer for more effective control of the air brake system.

The focus of this invention is the valve control mechanisms 16 or 32. Several alternative arrangements have been designed and are discussed in detail below. All the arrangements are designed to be fast acting, rugged and reliable, able to perform both emergency air pipe 14 or 28 venting or normal/testing air pipe 14 or 28 venting, and able to operate with minimum power draw from the battery.

Figure 3:
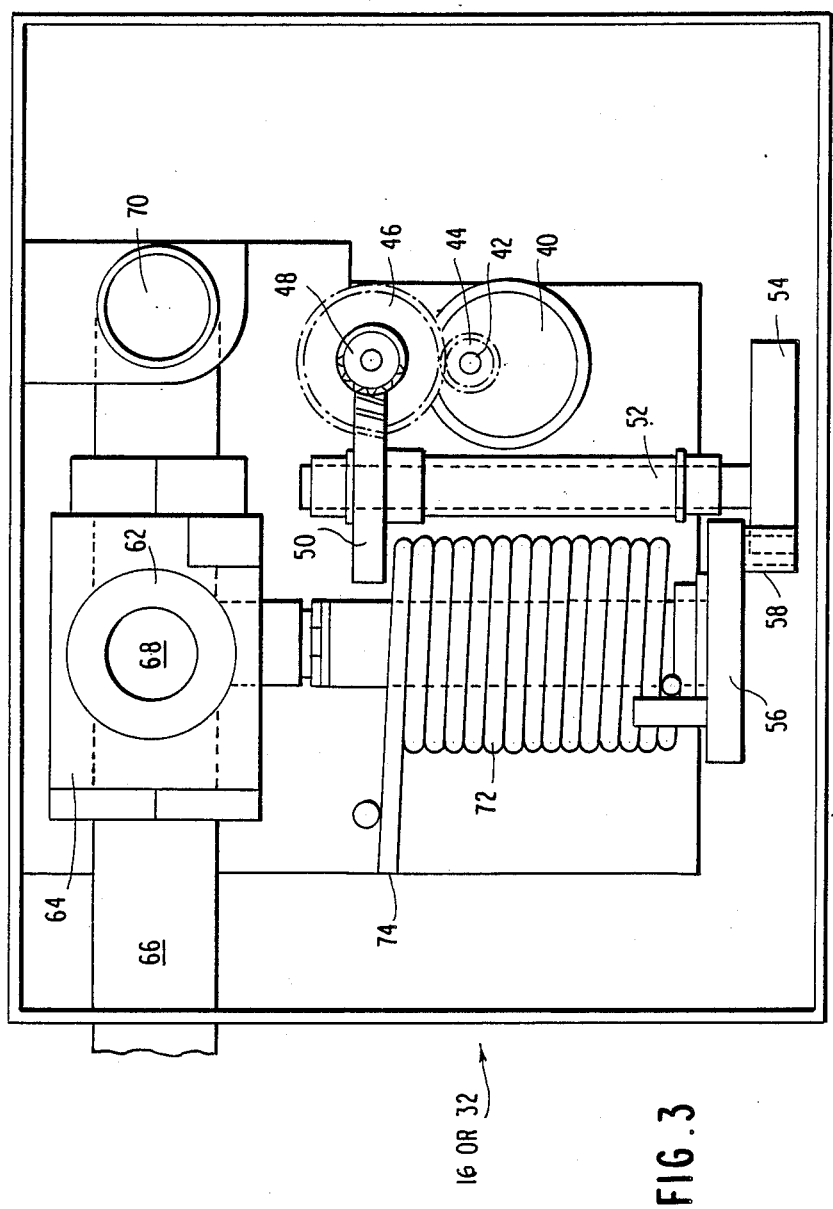
FIG. 3 is a cut away side view of a first valve control mechanism which utilizes a cam and follower arrangement for rotating the ball valve.

FIG. 3 shows a first, and preferred, arrangement of the valve control mechanism 16 or 32. A battery (not shown) provides current to an electric motor 40 which drives a shaft 42 with a spur gear 44. The spur gear 44 drives a large spur gear 46. The large spur gear 46 rotates a single thread worm 48. The worm 48 drives a worm gear 50 fixed to cam shaft 52. The cam 54 at the end of the shaft 52 rotates a cam follower 56 by acting against a follower pin 58. The cam follower 56 is fixed to shaft 60 and rotation of shaft 60 opens and closes the ball valve 62.

Air from the air pipe enters the ball valve housing 64 by pipe 66. The pipe 66 can be connected to the glad hand body as shown in FIG. 1 or a hose as shown in FIG. 2. When the cylindrical bore 68 through the ball valve 62 is in alignment with pipe 66, air is vented to the atmosphere through pipe 70. The amount of air passing through ball valve 62 is regulated by the amount of alignment of cylindrical bore 68. In an emergency operation, the ball valve 62 is rotated quickly to full alignment with pipes 66 and 70, thereby allowing immediate venting of all the air in the pipe. In a normal/testing operation, the cam 54 is driven such that the ball valve 62 rotates slowly so that a selected amount of air can be vented depending on the amount of alignment of cylindrical bore 68 and the time duration of the alignment.

A torsion spring 72 is connected to a frame section 74 at one end and the cam follower 56 at the other end. As the cam follower is rotated by the cam 54, the torsion spring 72 becomes wound. The torsion spring 72 stores energy as it becomes wound more tightly. As will be shown below, the cam is shaped with a concave section that allows the torsion spring 72 to unwind with a rapid release of stored energy. As the torsion spring 72 unwinds, the cam follower 56 is pulled, thus rotating shaft 60 and ball valve 62. The torsion spring 74 should be chosen with speed in mind; that is, the materials and the number of windings should be selected such that the rapidity in which the ball valve 62 is rotated to full open is as fast as possible (preferably on the order of tens or hundreds of milliseconds). The ability to open the ball valve 62 rapidly is a key advantage of this design over a direct linkage from an electric motor 40 which cannot produce the turning force and speed of the unwinding torsion spring 72. Another advantage of this system is that the current draw on the battery is on the order of tenths of amps because the stored energy in the spring 72 is being used to open the ball valve 62 rather than energy produced by electric motor 40. If a direct linkage from the electric motor 40 to the ball valve 62 were used, approximately five or more amps (relatively high current) would be demanded from the battery.

Figure 4A:
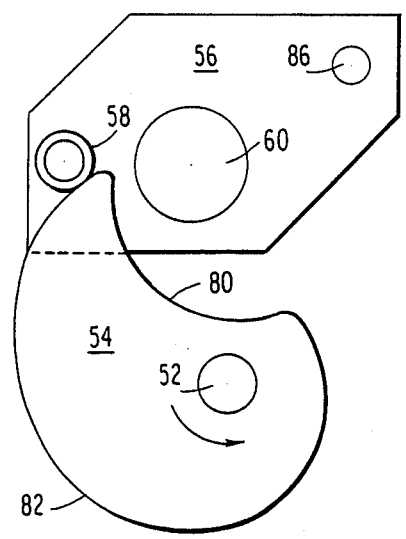
FIGS. 4a, 4b, 4c and 4d are sequential top views of the cam and cam follower showing the movement of the cam for opening and closing the ball valve.
Figure 4B:
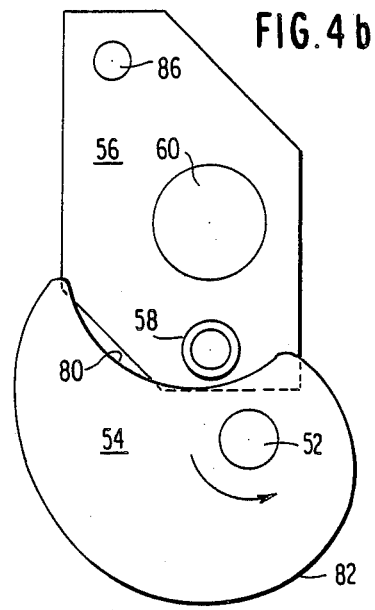
Figure 4C:
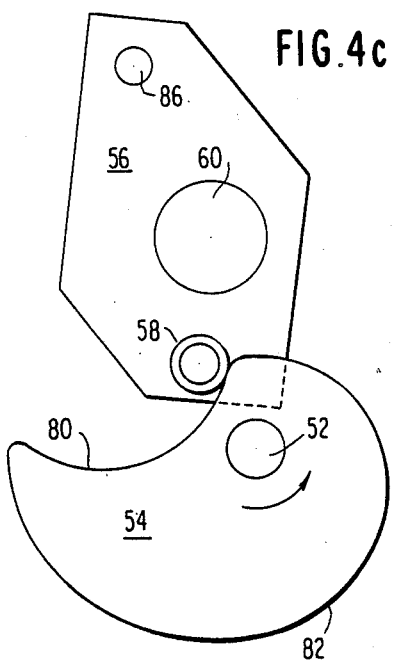
Figure 4D:
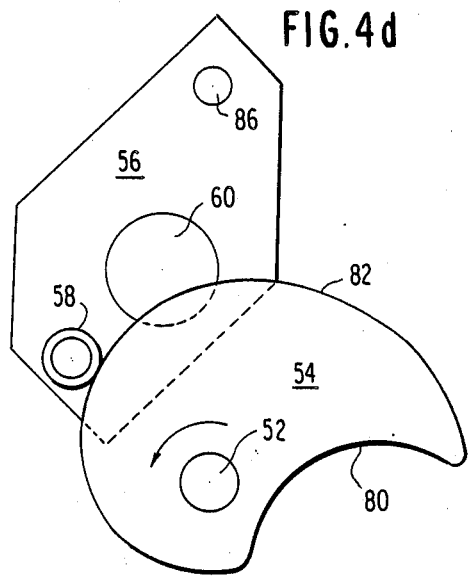
Figure 5:
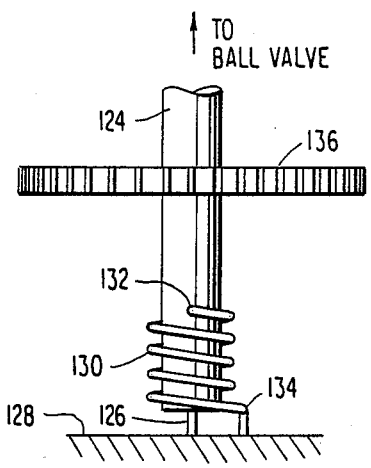
FIG. 5 is a side view of a shaft for driving a ball valve having a gear section on the shaft and a torsion spring wrapped around the shaft.

FIGS. 4a through 4d show sequential views of the cam 54 and cam follower 56 where the ball valve is closed in FIG. 4a, the ball valve has opened in FIG. 4b, and the ball valve is being closed in FIGS. 4c and 4d. Reference back to FIG. 3 may be helpful in understanding the operation of the camming mechanism. The cam 54 has a concave surface 80 and a convex surface 82. The cam shaft 52 is secured to the cam 54 near one end. The cam 54 acts against the follower pin 58, which projects up from the cam follower 56. The torsion spring 72 is secured to the cam follower 56 at the point 86 near one end.

In operation, the electric motor 40 drives the cam shaft 52 through the gear linkage 42, 44, 46, 48, and 50. The ball valve 62 is fully closed when the follower pin 58 reaches the position on the cam 54 shown FIG. 4a. The position of the follower pin 58 can be optically sensed or sensed by some other position sensor means (not shown) and this information can be transmitted to the locomotive cab to indicate that the ball valve 62 is closed and used by microelectronic circuitry to stop the electric motor. When the ball valve 62 is fully closed, as shown in FIG. 4a, the torsion spring 72 is wound to its tightest point. During an emergency operation, the cam 54 is rotated counterclockwise as shown in FIG. 4b, causing the follower pin 58 to race along the concave surface 80 of cam 54. The torsion spring 72 releases its stored energy and pulls on the cam follower 56, thus causing shaft 60 and ball valve 62 to rotate. The ball valve 62 is preferably turned to its full open position in a time period on the order of tens to hundreds of milliseconds. Because the torsion spring 72 does the work in rotating shaft 60, the power demand on the battery is minimal. To close the ball valve 62 from its full open position, the cam 54 is rotated counterclockwise with the follower pin moving along the convex surface 82 of cam 54 as shown in FIGS. 4c and 4d. The ball valve 62 will be fully closed when the follower pin 58 reaches the position shown in FIG. 4a. Since the ball valve 62 is closed slowly (relative to the opening operation), the power demand on the battery is kept small.

An important feature of this invention is the ability of the ball valve 62 to be opened and closed in a normal/testing mode as well as being immediately opened in an emergency situation. This is accomplished by rotating the cam 54 in a clockwise direction and having the follower pin 58 move along the convex surface 82 of cam 54. The ball valve 62 is fully closed when the follower pin 58 is positioned as shown in FIG. 4a, and is opening as the follower pin 58 moves along the convex surface 82, as is the case in FIG. 4d. The ball valve 62 can be rotated to any orientation from fully closed to fully open under the control of the electric motor 40. Position sensors (not shown) can be provided for sensing the position of the cam follower 56 and telemetry equipment 34 can transmit this information to the locomotive cab. The engineer in the locomotive cab could use the information to stop the ball valve 62 at ½ open, open, et cetera. Various tests can be performed remotely by venting certain quantities of air and performing air pressure measurements.

FIGS. 5 and 6a–6c show an alternative control mechanism for opening and closing a ball valve. A shaft 124 may be directly or indirectly connected to the ball valve (not shown), whereby rotation of the shaft 124 causes the ball valve to open and close. The shaft 124 freely rotates on a pin 126 connected to a non-rotating surface 128 of the gear box. A torsion spring 130 is connected to the shaft 124 at point 132 and is connected to the non-rotating surface 128 at point 134. Gear 136, positioned on the shaft 124, is used for rotating the shaft 124. As gear 136 is turned, a return energy torque is built up in spring 130, such that if the gear 136 is released, the spring 130 will rapidly return the shaft 124 to its starting position.

Figure 6A:
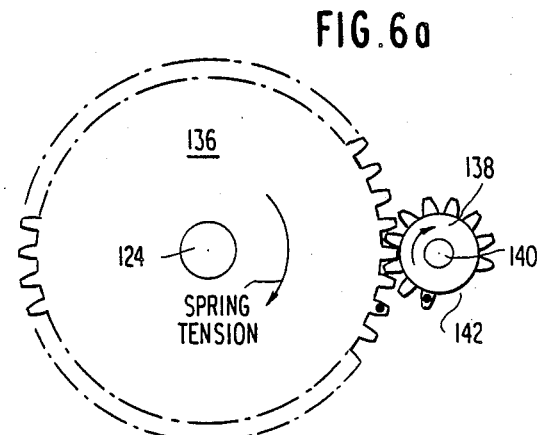
FIGS. 6a, 6b and 6c are successive top views of gears used for driving the shaft, to which the ball valve is connected, where a toothless section of a motor driven gear allows the torsion spring to rapidly release stored energy and open the ball valve.
Figure 6B:
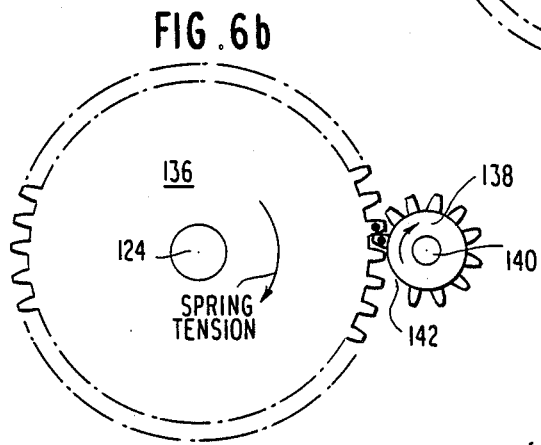
Figure 6C:
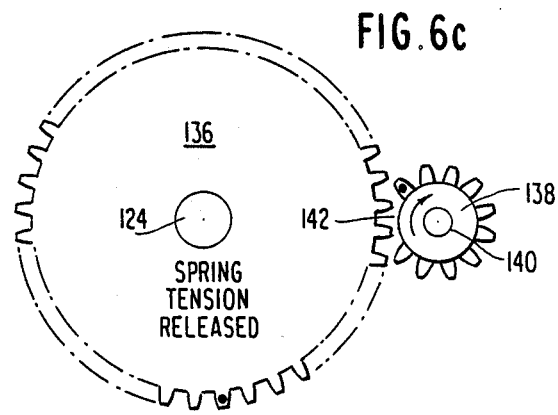

FIGS. 6a through 6c show progressive views of a drive gear 138 which cooperates with gear 136 on shaft 124. The drive gear 138 may be directly connected to an electric motor (not shown) by shaft 140. A toothless section 142 on the drive gear 138 allows rapid opening of the ball valve in an emergency situation. As the drive gear 138 rotates gear 136, energy in spring 130 is built up. FIG. 6b shows the relative positions of the motor driven gear 138 and shaft gear 136 when the ball valve is closed. Having the electric motor rotate the drive gear 138 one tooth farther allows the shaft gear 136 to slip past the drive gear 138 via the toothless section 142 as shown in FIG. 6c. The energy stored in spring 130 is rapidly released, thus opening the ball valve in an extremely short time period. A stop (not shown) can be provided to halt the shaft 124 after the spring 130 torque is released to allow the borehole to be lined up in full open position (note that only a one quarter turn of gear 136 is required for rotating the ball valve from full closed to full open). Because the electric motor merely needs to turn the drive gear 138 one tooth farther for an emergency open operation of the ball valve, a minimum electrical power demand is placed on the battery.

The motor driven gear 138 can be rotated in the opposite direction to cause the ball valve to open more slowly and in a controlled manner. Opening the ball valve under the control of the motor can be done in a precise manner such that the amount of air loss can be controlled. For example, if an air brake test is desired, the shaft 124 can be rotated in cooperation with the motor driven gear 138 such that the borehole allows some air to escape, i.e., 2 psi (pressure monitored by a sensor which telemeters the information to the locomotive cab). The motor driven gear 138 can then close the ball valve by rotating back to the position shown in FIG. 6b.

FIG. 7 shows an alternative arrangement for controlling a ball valve. The electric motor 222 rotates a drive screw 250 on which is mounted a follower 252 which acts against a lever 254. The lever 254 rotates a shaft 56 that turns the ball valve (not shown). A torsion spring 258 provides bias against lever 254. When the follower 252 travels to the closed position sensor 260, the ball valve is closed. If the follower 252 travels past the closed position sensor 260 towards the bearing stop 261, the lever 254 will be free to move past the follower 252 and the torsion spring 258 will quickly force the lever 254 towards the spring stop 262. The action of the torsion spring 258 is used during an emergency operation when the air pipe must be quickly vented. The ball valve is in its full open position when the lever 254 is pressed against the spring stop 262. In between the closed position sensor 260 and the spring stop 262, the follower 252 can be positioned by the motor 222 such that small valve openings can be achieved for test purposes. The position of the follower 252 can be sensed and the sensed position corresponds to the orientation of the ball valve. Two way communications can provide precise control of the motor 222 as it causes the follower 252 to travel along screw 250.

FIGS. 8a and 8b show another alternative arrangement for controlling the ball valve which allows control in a normal/test mode and control in an emergency mode. The electric motor 322 drives a shaft 370 having a torsion spring 372 connected thereto. The torsion spring 372 is connected to a shaft 374 which controls the rotation of the ball valve. A cam 376 positioned on the shaft 374 acts against a slug 378 biased by a compression spring 380. In operation, the motor 322 turns the spring 372 such that it becomes tight and the spring 372 causes the shaft 374 to rotate, thereby closing the ball valve. The ball valve is closed at the point where the energy in the torsion spring 372 and the compression spring 380 are equal. If the motor rotates the shaft 374 such that the cam 376 can overcome the energy in the compression spring 380 slug 378 arrangement, the energy stored in the torsion spring 372 is released and the ball valve is immediately opened.

While the invention has been described in terms of several preferred embodiments, those skilled in the art will recognize that the invention may be practiced with modification within the spirit an scope of the appended claims.

Having thus described our invention, what we claim as new and desire to secure by Letters Patent is as follows:

1. A rapid release valve mechanism comprising:
   a ball valve including a rotating ball member and a housing;
   drive means connected to said rotating ball member for rotating said ball member between closed and open positions;
   an electric motor disengageably connected to drive said drive means;
   torsion means connected to said ball member and prestressed by said drive means when said electric motor drives said drive means to rotate said ball member to a closed position and
   actuator means for disengaging said electric motor from said drive means and allowing said torsion means to rapidly rotate said ball member to an open position.

2. The rapid release valve mechanism as recited in claim 1 further comprising remote control means for responding to commands for controlling said electric motor to drive said drive means and rotate said ball member and also for controlling said actuator means to disengage said electric motor from said drive means.

3. The rapid release valve mechanism as recited in claim 1 wherein said drive means comprises a first gear positioned on a first shaft connected to said ball member and a second gear positioned on a second shaft connected to said electric motor, said second gear meshing with said first gear, and wherein said actuator means comprises a toothless section of said second gear, said toothless section permitting said first gear to slip past said second gear.

4. The rapid release valve mechanism as recited in claim 3 wherein said torsion means comprises a spring having a first end connected to said first shaft and rotating therewith and having a second end connected to a non-rotating member, whereby said spring is stressed when said first shaft is rotated under the power of said electric motor, said stress being released when said electric motor is disengaged by said toothless section permitting said first gear to slip past said second gear.

5. The rapid release valve mechanism as recited in claim 1 wherein said drive means comprises a cam follower positioned on a first shaft connected to said ball member and a cam positioned on a second shaft connected to said electric motor, said cam cooperating with said cam follower, and wherein said actuator means comprises a concave section of said cam, said concave section permitting said cam follower to freely rotate.

6. The rapid release valve mechanism as recited in claim 5 wherein said torsion means comprises a spring having a first end connected to said first shaft and rotating therewith and having a second end connected to a non-rotating member, whereby said spring is stressed when said first shaft is rotated under the power of said electric motor, said stress being released when said electric motor is disengaged by said concave section.

7. A rapid release valve mechanism comprising:
a ball valve including a rotating ball member and a housing;
lead screw and follower means operating against a lever connected to said rotating ball member for rotating said ball member between a closed and varying open positions;
an electric motor disengageably connected to drive said lead screw and follower means;
torsion means connected to said lever and prestressed by said lead screw and follower means when said electric motor drives said lead screw and follower means to rotate said ball member to a closed position; and
actuator means for disengaging said lever from said lead screw and follower means and allowing said torsion means to rapidly rotate said ball member to a full open position.

8. The rapid release valve mechanism as recited in claim 7 further comprising remote control means for responding to commands for controlling said electric motor to drive said lead screw and follower means and rotate said ball member and also for controlling said actuator means to disengage said lever from said lead screw and follower means.

9. The rapid release valve mechanism as recited in claim 7 wherein said lead screw and follower means comprises a lead screw connected to said electric motor and a follower positioned on said lead screw, said follower travels along the length of said lead screw as said electric motor rotates said lead screw, and wherein said actuator means comprises a projection on said follower which acts against a first side of said lever, said lever being disengaged when said follower travels to a point on said lead screw where said projection cannot operate against said first side of said lever.

10. The rapid release valve mechanism as recited in claim 9 wherein said torsion means comprises a torsion spring biased against a second side of said lever, said torsion spring being stressed as said projection on said follower operates against said first side of said lever, said stress being released when said follower travels to said point on said lead screw where said projection cannot operate against said first side of said lever.

11. A rapid release valve mechanism comprising:
an electric motor for rotating a first shaft;
a second shaft connected to a ball valve including a rotating ball member and housing, said shaft having a camming lobe thereon;
a compression bias means for operating against said camming lobe; and
a torsion spring having a first end connected to said first shaft and a second end connected to said second shaft;
said electric motor rotating said first shaft, said torsion spring rotating said second shaft, said torsion spring being stressed during a time period when said compression bias halts the rotation of said second shaft, said stress in said torsion spring being released when said compression bias is overcome causing said ball member to be rotated to a full open position.

12. The rapid release valve mechanism as recited in claim 9 further comprising a remote control means for responding to commands for controlling said electric motor to rotate said first shaft.

* * * * *